(12) United States Patent
Liu et al.

(10) Patent No.: US 10,614,238 B2
(45) Date of Patent: Apr. 7, 2020

(54) DATA PROTECTION METHOD AND APPARATUS

(71) Applicant: HUAWEI TECHNOLOGIES CO., LTD., Shenzhen, Guangdong (CN)

(72) Inventors: Yutao Liu, Shanghai (CN); Yubin Xia, Shanghai (CN); Haibo Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 15/820,769

(22) Filed: Nov. 22, 2017

(65) Prior Publication Data
US 2018/0096162 A1 Apr. 5, 2018

Related U.S. Application Data

(63) Continuation of application No. PCT/CN2016/080006, filed on Apr. 22, 2016.

(30) Foreign Application Priority Data

May 29, 2015 (CN) .......................... 2015 1 0288439

(51) Int. Cl.
*G06F 21/54* (2013.01)
*G06F 21/62* (2013.01)
(Continued)

(52) U.S. Cl.
CPC .......... *G06F 21/6218* (2013.01); *G06F 12/08* (2013.01); *G06F 12/1009* (2013.01);
(Continued)

(58) Field of Classification Search
CPC .......... G06F 21/52; G06F 21/53; G06F 21/54; G06F 21/6218
See application file for complete search history.

(56) References Cited

U.S. PATENT DOCUMENTS 8,010,763 B2 8/2011 Armstrong et al.
8,726,392 B1 5/2014 McCorkendale et al.
(Continued)

FOREIGN PATENT DOCUMENTS

CN 103413093 A 11/2013
CN 103473117 A 12/2013
(Continued)

OTHER PUBLICATIONS

Liu, Yutao et al., "Thwarting Memory Disclosure with Efficient Hypervisor-enforced Intra-domain Isolation," CCS'15, Denver, Colorado, Oct. 12-16, 2015, total 13 pages.
(Continued)

*Primary Examiner* — David J Pearson
(74) *Attorney, Agent, or Firm* — Gregg L. Jansen

(57) ABSTRACT

A data protection method includes detecting whether critical code of an application has been called, with the critical code being used to access critical data; switching from a preconfigured first extended page table (EPT) to a preconfigured second EPT according to preset trampoline code corresponding to the critical code when an operating system calls the critical code using the first EPT, wherein memory mapping relationships of the critical data and the critical code are not configured in the first EPT, the memory mapping relationships of the critical data and the critical code are configured in the second EPT, and the critical data and the critical code are separately stored in independent memory areas; and switching from the second EPT back to the first EPT according to the trampoline code after calling and executing the critical code using the second EPT.

16 Claims, 8 Drawing Sheets

(51) Int. Cl.
*G06F 21/52* (2013.01)
*G06F 12/1009* (2016.01)
*G06F 21/78* (2013.01)
*G06F 12/08* (2016.01)
*G06F 21/56* (2013.01)
*G06F 12/14* (2006.01)
*G06F 21/51* (2013.01)
*G06F 21/74* (2013.01)
*G06F 21/57* (2013.01)

(52) U.S. Cl.
CPC .............. *G06F 21/52* (2013.01); *G06F 21/54* (2013.01); *G06F 21/563* (2013.01); *G06F 21/566* (2013.01); *G06F 21/78* (2013.01); *G06F 12/145* (2013.01); *G06F 21/51* (2013.01); *G06F 21/577* (2013.01); *G06F 21/62* (2013.01); *G06F 21/74* (2013.01); *G06F 2212/1052* (2013.01); *G06F 2212/151* (2013.01); *G06F 2212/657* (2013.01); *G06F 2221/034* (2013.01)

(56) References Cited

U.S. PATENT DOCUMENTS

| | | | |
|---|---|---|---|
| 9,311,508 B2 | 4/2016 | Leslie-Hurd et al. | |
| 2007/0006175 A1* | 1/2007 | Durham | G06F 21/54 717/131 |
| 2008/0201540 A1* | 8/2008 | Sahita | G06F 12/08 711/159 |
| 2013/0007325 A1* | 1/2013 | Sahita | G06F 13/24 710/267 |
| 2013/0125119 A1 | 5/2013 | Vipat et al. | |
| 2013/0135902 A1 | 5/2013 | Umemura | |
| 2013/0174147 A1 | 7/2013 | Sahita et al. | |
| 2014/0189194 A1* | 7/2014 | Sahita | G06F 12/1009 711/6 |
| 2014/0312112 A1 | 10/2014 | Floyd et al. | |
| 2014/0380009 A1 | 12/2014 | Lemay et al. | |
| 2016/0048464 A1* | 2/2016 | Nakajima | G06F 12/1475 711/152 |

FOREIGN PATENT DOCUMENTS

| | | |
|---|---|---|
| CN | 103620614 A | 3/2014 |
| CN | 103699498 A | 4/2014 |
| CN | 103996004 A | 8/2014 |

OTHER PUBLICATIONS

Chen, Xiaoxin et al., "Overshadow: A Virtualization-Based Approach to Retrofitting Protection in Commodity Operating Systems," ASPLOS'08, Seattle, Washington, Mar. 1-5, 2008, total 12 pages.

* cited by examiner

DATA PROTECTION METHOD AND APPARATUS

CROSS-REFERENCE TO RELATED APPLICATIONS

This application a continuation of International Application No. PCT/CN2016/080006, filed on Apr. 22, 2016, which claims priority to Chinese Patent Application No. 201510288439.3, filed on May 29, 2015. The disclosures of the aforementioned applications are hereby incorporated by reference in their entireties.

TECHNICAL FIELD

The present application relates to the technical field of data security, and in particular, to a data protection method and apparatus.

BACKGROUND

In April of 2014, an extremely severe security vulnerability that is referred to as "heartbleed" was found in the Open Secure Sockets Layer (OpenSSL) protocol, which is widely used for public key authentication and data encryption on the Internet. This vulnerability is identified as CVE-2014-0160. The vulnerability is caused because boundary detection is not performed during processing of heartbeat (heartbeat) extension in the Transport Layer Security (Transport Layer Security, TLS) protocol supported by the OpenSSL protocol. Consequently, an attacker can read up to 64 KB of data at will from memory leakage of client-server connection data. That is, without any privilege information or authentication, the attacker may read critical data from a server, including a private key of an X.509 certificate, a user name, a password, and the like. In the case of server private key leakage, installing security patches for server-related code is not sufficient to prevent damage that the leakage may cause. The leakage may put individuals and enterprises in a crisis in the future, and a series of measures such as reissuing a certification authority (Certificate Authority, CA) certificate, patching an application of a service provider, upgrading a browser of a user, and changing a password need to be taken to reduce potential losses.

One important reason why the "heartbleed" vulnerability has caused quite a stir is that OpenSSL is a cornerstone for secure data transmission on the Internet, and included private keys of certificates, user names, passwords, and the like are critical data in the cornerstone. It can be concluded that, leakage of critical data in some critical applications on a cloud computing platform not only brings security threats to the cloud computing platform itself, but also may endanger personal computers (Personal Computer, PC), mobile phones, and other devices, causing great irremediable economic losses. In a threat model with various increasingly powerful network attacks, viruses, and even malicious operating systems, zero-day (zero-day) vulnerabilities, and the like, how to improve security of critical data in a critical application on a cloud computing platform has become an urgent problem that needs to be resolved.

The prior art includes a solution. The method is mainly encrypted storage of critical data. This is a commonly used method, and encrypting critical data can increase a difficulty in stealing the critical data by an attacker, making the critical data obtained by the attacker unreadable.

However, encrypting critical data cannot completely prevent the critical data from being stolen. Because critical data needs to be accessed by normal logic of an application (for example, in OpenSSL, critical data needs to be decrypted with a key), if the critical data is encrypted, the critical data certainly needs to be decrypted at some particular moments, making plaintext data exposed in a memory. Moreover, because a key for encryption and decryption is stored in the memory, the key is also exposed to attack surfaces of attackers and malicious operating systems.

SUMMARY

Embodiments of the present application provide a data protection method and apparatus, so as to resolve a prior-art problem that security of critical data cannot be ensured.

The following technical solutions are used in the embodiments of the present application:

According to a first aspect, a data protection method is provided, including:

detecting whether critical code that is in an application and that is used to access critical data is called;

during running of the application, when detecting that an operating system calls the critical code by using a preconfigured first extended page table EPT, switching from the first EPT to a preconfigured second EPT according to preset trampoline code corresponding to the critical code, where memory mapping relationships of the critical data and the critical code are not configured in the first EPT, the memory mapping relationships of the critical data and the critical code are configured in the second EPT, and the critical data and the critical code are separately stored in independent memory areas; and after calling and executing the critical code by using the second EPT, switching from the second EPT back to the first EPT according to the trampoline code.

With reference to the first aspect, in a first possible implementation, before the detecting whether critical code that is in an application and that is used to access critical data is called, the method further includes:

obtaining an original EPT, where memory mapping relationships of all pieces of data and memory mapping relationships of all pieces of code in the application are configured in the original EPT;

determining the critical data and the critical code used to access the critical data; and deleting the memory mapping relationships of the critical data and the critical code in the original EPT according to a memory area in which the critical data is located and a memory area in which the critical code is located, and adding a memory mapping relationship of the trampoline code to the original EPT, to obtain the first EPT.

With reference to the first possible implementation of the first aspect, in a second possible implementation, after the determining the critical data and the critical code used to access the critical data, the method further includes:

adjusting the memory area in which the critical data is located and the memory area in which the critical code is located, so that the critical data and the critical code are separately stored in independent memory areas; and correspondingly adjusting the memory mapping relationships of the critical data and the critical code in the original EPT according to adjusted memory areas in which the critical data and the critical code are located, deleting a memory mapping relationship of non-critical code in the original EPT, and adding the memory mapping relationship of the trampoline code to the original EPT, to obtain the second EPT.

With reference to the first possible implementation of the first aspect or the second possible implementation of the first aspect, in a third possible implementation, the determining the critical code used to access the critical data includes:

performing a dynamic analysis on source code in the application, to determine a first critical code set related to the critical data; and determining code in the first critical code set as the critical code used to access the critical data.

With reference to the third possible implementation of the first aspect, in a fourth possible implementation, the performing a dynamic analysis on source code in the application, to determine a first critical code set related to the critical data includes:

adjusting the memory area in which the critical data is located, so that the critical data is stored in an independent memory area;

during running of the application, when any instruction is executed to access the memory area in which the critical data is located, recording critical code corresponding to the instruction; and determining the first critical code set according to the recorded critical code.

With reference to the first possible implementation of the first aspect, the second possible implementation of the first aspect, the third possible implementation of the first aspect, or the fourth possible implementation of the first aspect, in a fifth possible implementation, the method further includes:

when a call to non-critical code in the application performed by using the first EPT causes an exception during running of the application, determining whether the non-critical code is in a second critical code set, where the second critical code set is code that is related to the critical data and that is determined by performing a static analysis on the source code in the application; and if yes, updating the determined critical code, so that the non-critical code is updated to critical code; and reconfiguring the first EPT and the second EPT by using the determined critical data and the updated critical code.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation, the switching from the first EPT to a preconfigured second EPT according to preset trampoline code corresponding to the critical code includes:

calling extended page table pointer switching EPTP switching according to the trampoline code, to switch from the first EPT to the second EPT.

With reference to the first aspect, the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in a seventh possible implementation, the switching from the second EPT back to the first EPT according to the trampoline code includes:

calling EPTP switching according to the trampoline function, to switch from the second EPT back to the first EPT.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in an eighth possible implementation, the calling and executing the critical code by using the second EPT includes:

calling the critical code by using the second EPT, and performing formal verification on the critical code; and executing the critical code after the formal verification on the critical code succeeds.

According to a second aspect, a data protection apparatus is provided, including:

a detection unit, configured to detect whether critical code that is in an application and that is used to access critical data is called;

a first switching unit, configured to: when the detection unit detects that an operating system calls the critical code by using a preconfigured first extended page table EPT, switch from the first EPT to a preconfigured second EPT according to preset trampoline code corresponding to the critical code, where memory mapping relationships of the critical data and the critical code are not configured in the first EPT, the memory mapping relationships of the critical data and the critical code are configured in the second EPT, and the critical data and the critical code are separately stored in independent memory areas; and a second switching unit, configured to: after the critical code is called and executed by using the second EPT to which the first switching unit switches, switch from the second EPT back to the first EPT according to the trampoline code.

With reference to the second aspect, in a first possible implementation, the apparatus further includes: an original EPT obtaining unit, a critical data and critical code determining unit, and a first EPT obtaining unit, where the original EPT obtaining unit is configured to obtain an original EPT, where memory mapping relationships of all pieces of data and memory mapping relationships of all pieces of code in the application are configured in the original EPT;

the critical data and critical code determining unit is configured to determine the critical data and the critical code used to access the critical data; and the first EPT obtaining unit is configured to delete, according to a memory area in which the critical data determined by the critical data and critical code determining unit is located and a memory area in which the critical code determined by the critical data and critical code determining unit is located, the memory mapping relationships of the critical data and the critical code in the original EPT obtained by the original EPT obtaining unit, and add a memory mapping relationship of the trampoline code to the original EPT, to obtain the first EPT.

With reference to the first possible implementation of the second aspect, in a second possible implementation, the apparatus further includes:

a second EPT obtaining unit, configured to: after the critical data and critical code determining unit determines the critical data and the critical code used to access the critical data, adjust the memory area in which the critical data is located and the memory area in which the critical code is located, so that the critical data and the critical code are separately stored in independent memory areas; and correspondingly adjust, according to adjusted memory areas in which the critical data and the critical code are located, the memory mapping relationships of the critical data and the critical code in the original EPT obtained by the original EPT obtaining unit, delete a memory mapping relationship of non-critical code in the original EPT, and add the memory mapping relationship of the trampoline code to the original EPT, to obtain the second EPT.

With reference to the first possible implementation of the second aspect or the second possible implementation of the second aspect, in a third possible implementation, the critical data and critical code determining unit includes:

a dynamic analysis module, configured to perform a dynamic analysis on source code in the application, to determine a first critical code set related to the critical data; and a critical code determining module, configured to determine code in the first critical code set, which is determined by the dynamic analysis module, as the critical code used to access the critical data.

With reference to the third possible implementation of the second aspect, in a fourth possible implementation, the dynamic analysis module is configured to:

adjust the memory area in which the critical data is located, so that the critical data is stored in an independent memory area; when any instruction accesses the memory area in which the critical data is located, record critical code corresponding to the instruction; and determine the first critical code set according to the recorded critical code.

With reference to the first possible implementation of the second aspect, the second possible implementation of the second aspect, the third possible implementation of the second aspect, or the fourth possible implementation of the second aspect, in a fifth possible implementation, the apparatus further includes a critical code update unit and a reconfiguration unit, where the critical code update unit is configured to: when a call to non-critical code in the application performed by using the first EPT causes an exception during running of the application, determine whether the non-critical code is in a second critical code set, where the second critical code set is code that is related to the critical data and that is determined by performing a static analysis on the source code in the application; and if yes, update the determined critical code, so that the non-critical code is updated to critical code; and the reconfiguration unit is configured to reconfigure the first EPT and the second EPT by using the critical data and the critical code updated by the critical code update unit.

With reference to the second aspect, the first possible implementation of the second aspect, the second possible implementation of the second aspect, the third possible implementation of the second aspect, the fourth possible implementation of the second aspect, or the fifth possible implementation of the second aspect, in a sixth possible implementation, the first switching unit is configured to:

call extended page table pointer switching EPTP switching according to the trampoline code, to switch from the first EPT to the second EPT.

With reference to the second aspect, the first possible implementation of the second aspect, the second possible implementation of the second aspect, the third possible implementation of the second aspect, the fourth possible implementation of the second aspect, the fifth possible implementation of the second aspect, or the sixth possible implementation of the second aspect, in a seventh possible implementation, the second switching unit is configured to:

call EPTP switching according to the trampoline function, to switch from the second EPT back to the first EPT.

With reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, or the seventh possible implementation of the second aspect, in an eighth possible implementation, the second switching unit includes:

a formal verification module, configured to: call the critical code by using the second EPT, and perform formal verification on the critical code; and a critical code execution module, configured to execute the critical code after the formal verification performed by the formal verification module on the critical code succeeds.

The embodiments of the present application have the following beneficial effects:

In the embodiments of the present application, a data protection apparatus detects whether critical code that is in an application and that is used to access critical data is called; when detecting that an operating system calls the critical code by using a preconfigured first EPT, switches from the first EPT to a preconfigured second EPT according to preset trampoline code corresponding to the critical code; and after calling and executing the critical code by using the second EPT, switches from the second EPT back to the first EPT according to the trampoline code. Because memory mapping relationships of the critical data and the critical code are not configured in the first EPT, and the memory mapping relationships of the critical data and the critical code are configured in the second EPT, the critical data can be accessed by using only the second EPT. Besides, because the critical data and the critical code are separately stored in independent memory areas, that is, the critical data and the critical code are stored separately from non-critical data and non-critical code, the critical data cannot be directly accessed by using the second EPT by means of a vulnerability in the application. Moreover, because switching from the first EPT to the second EPT can be implemented only according to the preset trampoline code corresponding to the critical code, a malicious operational program cannot switch to the second EPT by launching a code embedding attack. In this way, the critical data in the application is protected to the greatest extent, and security of the critical data is improved.

Other characteristics and advantages of the present application are to be described in the specification, and some become apparent in the specification or are understood by means of implementation of the present application. The objective of the present application and other advantages can be implemented and obtained by using a structure particularly pointed out in the written specification, claims, and accompanying drawings.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and persons of ordinary skill in the art may still derive other drawings from these accompanying drawings without creative efforts.

The accompanying drawings described herein are intended to provide a further understanding of the present application, and constitute a part of the present application. The illustrative embodiments of the present application and descriptions thereof are intended to describe the present application, and do not constitute limitations on the present application. In the drawings.

DESCRIPTION OF EMBODIMENTS

Currently, among numerous technologies for protecting critical data, encrypted storage of critical data is a technology that is most widely used. Encrypted storage of critical data can greatly improve data security, making it more difficult for an attacker to obtain private data. However, this method has limitations. The problem of critical data security cannot be fundamentally resolved merely by encrypted storage. Because critical data needs to be used in a program, a key for encrypting the critical data is stored in a memory and exposed to an attacker. Moreover, if the critical data is accessed frequently, encryption and decryption operations may cause severe degradation in performance. Besides, in a threat model of the above method, a malicious operating system is not considered. How to prevent critical data in an application from being stolen in a threat model of a malicious operating system is also a problem worth exploring.

On a cloud computing platform, many enterprises provide services that are deployed in a virtual environment, for example, an elastic cloud computing platform (EC2: Elastic Cloud Computing) that appears on the market. In this environment, enterprise users rent virtual machines provided on the elastic cloud computing platform for computation, provide services to the outside, and pay rent based on usage time, network traffic, and storage sizes. This can greatly reduce costs for server construction and maintenance. Besides, some large enterprises and organizations also manage computers in a virtualized manner, for example, perform management by means of desktop virtualization. Each employee is allocated one virtual machine running on a server, and connects to the virtual machine from a client by using a remote desktop. In these scenarios, the virtual machine runs above a virtual machine monitor (Virtual Machine Monitor, VMM), and the VMM controls allocation of computing resources of the virtual machine. Moreover, the VMM has a higher running permission level than the virtual machine. This provides an opportunity for using the VMM to guard against a malicious operating system and improving security of critical code and data in an application running in the virtual machine.

Figure 1:
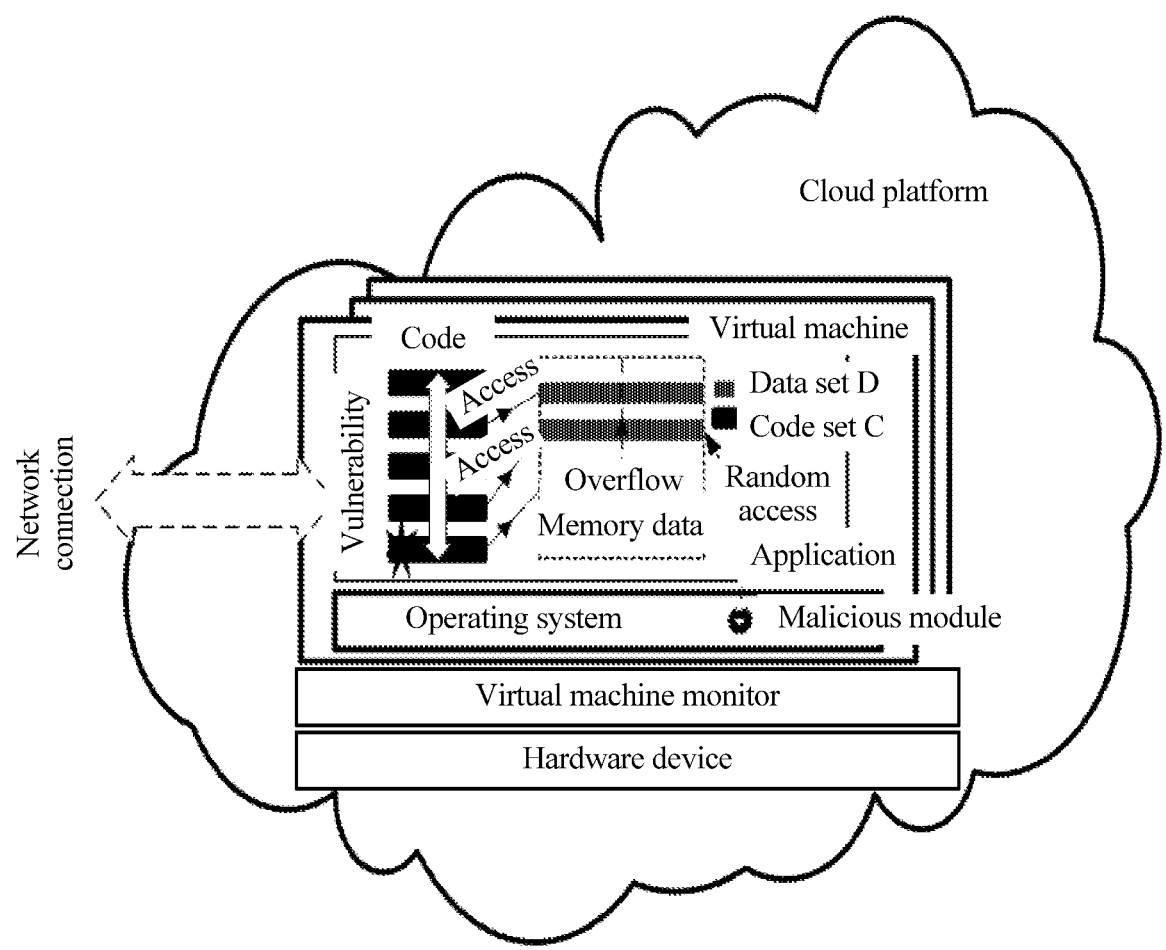
FIG. 1 is a schematic diagram of an execution environment of a critical application.

It is assumed that an application A runs in an operating system that may be malicious, and the operating system runs in a virtual environment provided by a cloud computing platform service provider, as shown in FIG. 1. It is assumed that a piece of critical data in the application A needs to be protected. The critical data may be transferred to different memory areas, and form a data set D. The data set D is to be accessed by a code set C. Therefore, in a threat model with a network attack, a zero-day vulnerability, and a malicious operating system, the data set D may be exposed to the following attack surfaces:

1. The application A has a vulnerability. An attacker can steal, from a network by using an attack method such as reading an overflowed buffer, data located in a same memory area as the application A, and the data may include the data set D.

2. The operating system has a malicious module, which can directly read the memory area of the application A and steal the data set D.

3. An attacker embeds malicious code into the memory area of the application A by means of a network attack or by using a module in the operating system, and actively reads and leaks the data set D.

These attacks are possible because the critical data and an entire software stack of the application are located in a same address space, and any vulnerability in the application may bring security threats to the critical data. Besides, a kernel of the operating system can map an entire memory in a user mode, and an excessively large trusted computing base of the operating system causes the critical data to be exposed to a larger threat model.

In view of the foregoing problems, embodiments of the present application provide a data protection solution. In the technical solution, a data protection apparatus detects whether critical code that is in an application and that is used to access critical data is called; when detecting that an operating system calls the critical code by using a preconfigured first EPT, switches from the first EPT to a preconfigured second EPT according to preset trampoline code corresponding to the critical code; and after calling and executing the critical code by using the second EPT, switches from the second EPT back to the first EPT according to the trampoline code. Because memory mapping relationships of the critical data and the critical code are not configured in the first EPT, and the memory mapping relationships of the critical data and the critical code are configured in the second EPT, the critical data can be accessed by using only the second EPT. Besides, because the critical data and the critical code are separately stored in independent memory areas, that is, the critical data and the critical code are stored separately from non-critical data and non-critical code, the critical data cannot be directly accessed by using the second EPT by means of a vulnerability in the application. Moreover, because switching from the first EPT to the second EPT can be implemented only according to the preset trampoline code corresponding to the critical code, a malicious operational program cannot switch to the second EPT by launching a code embedding attack. In this way, the critical data in the application is protected to the greatest extent, and security of the critical data is improved.

The following describes the embodiments of the present application with reference to the accompanying drawings of the specification. It should be understood that the embodiments described herein are merely used to describe and explain the present application, but are not intended to limit the present application. Moreover, in a case that no conflict occurs, the embodiments in the present application and the features in the embodiments may be mutually combined.

Figure 2:
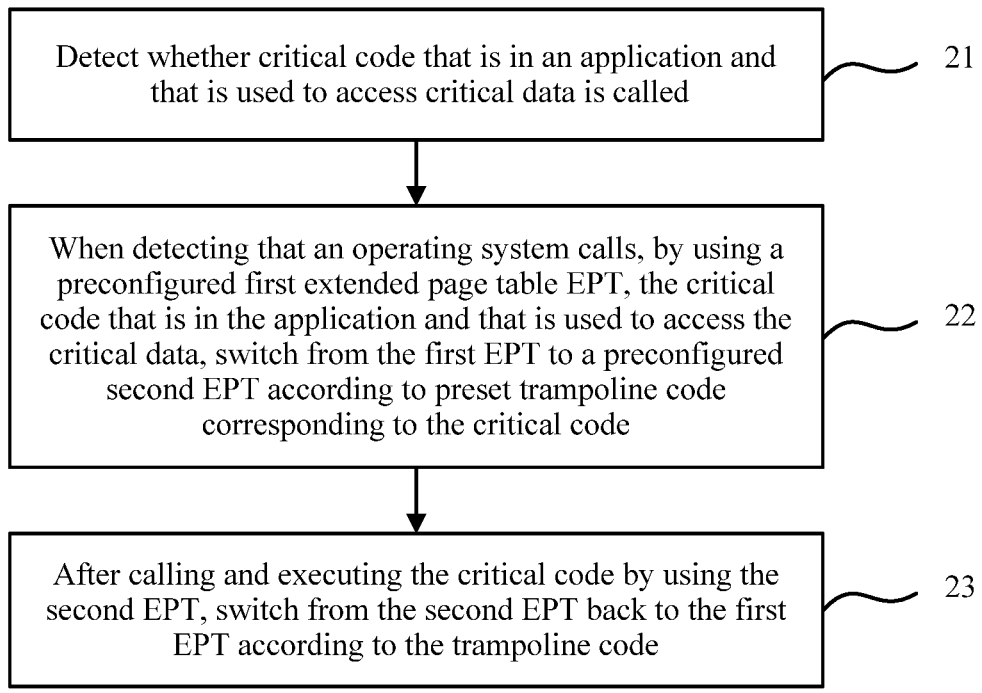
FIG. 2 is an implementation flowchart of a data protection method according to an embodiment of the present application.

An embodiment of the present application provides a data protection method. As shown in FIG. 2, which is an implementation flowchart of the method, the method includes the following steps:

Step 21: Detect whether critical code that is in an application and that is used to access critical data is called.

Step 22: When detecting that an operating system calls the critical code by using a preconfigured first extended page table EPT, switch from the first EPT to a preconfigured second EPT according to preset trampoline code corresponding to the critical code.

In this embodiment of the present application, extended page table pointer switching (Extended Page Table Pointer Switching, EPTP Switching) may be called according to the preset trampoline code corresponding to the critical code, to switch from the first EPT to the second EPT.

Step 23: After calling and executing the critical code by using the second EPT, switch from the second EPT back to the first EPT according to the trampoline code.

After the critical code is called and executed by using the second EPT, EPTP switching is called according to the preset trampoline code corresponding to the critical code, to switch from the second EPT back to the first EPT.

Memory mapping relationships of the critical data and the critical code are not configured in the first EPT, the memory mapping relationships of the critical data and the critical code are configured in the second EPT, and the critical data and the critical code are separately stored in independent memory areas.

In this embodiment of the present application, the first EPT and the second EPT that are used above may be preconfigured before the application runs.

Therefore, before step 21, the method may further include:

obtaining an original EPT, where memory mapping relationships of all pieces of data and memory mapping relationships of all pieces of code in the application are configured in the original EPT;

determining the critical data and the critical code in the application; and deleting the memory mapping relationships of the critical data and the critical code in the original EPT according to a memory area in which the determined critical data is located and a memory area in which the determined critical code is located, and adding a memory mapping relationship of the trampoline code to the original EPT, to obtain the first EPT.

Optionally, after the determining the critical data and the critical code, the method may further include:

adjusting the memory area in which the determined critical data is located and the memory area in which the determined critical code is located, so that the critical data and the critical code are separately stored in independent memory areas; and correspondingly adjusting the memory mapping relationships of the critical data and the critical code in the original EPT according to adjusted memory areas in which the critical data and the critical code are located, deleting a memory mapping relationship of non-critical code in the original EPT, and adding the memory mapping relationship of the trampoline code to the original EPT, to obtain the second EPT.

The critical data in the application may be determined according to an identifier pre-stored in the critical data.

A static analysis method or a dynamic analysis method may be used to determine the critical code that is in the application and that is used to access the critical data.

An embodiment of the present application provides a dynamic analysis method. A specific implementation process is as follows:

A dynamic analysis is performed on source code in the application, to determine a first critical code set related to the critical data. Code in the first critical code set is determined as the critical code used to access the critical data.

A specific process of performing a dynamic analysis on source code in the application, to determine a first critical code set related to the critical data is as follows:

First, the memory area in which the critical data is located is adjusted, so that the critical data is stored in an independent memory area.

The independent memory area in which the critical data is located is set to be in an unreadable and unwritable state.

Then, when any instruction accesses the memory area in which the critical data is located, critical code corresponding to the instruction is recorded.

Because the independent memory area in which the critical data is located is set to be in the unreadable and unwritable state, when any instruction accesses the memory area in which the critical data is located, a memory access error occurs, and an operation of recording the critical code corresponding to the instruction is triggered.

In addition, after the critical code corresponding to the instruction is recorded, the independent memory area in which the critical data is located is set to be in a readable and writable state, so that the program can proceed instead of being stuck with the memory access error. Moreover, a debug breakpoint is set in a next instruction of the instruction, so that when the next instruction of the instruction is executed, the specified debug breakpoint triggers an operation of setting the independent memory area in which the critical data is located to be in the unreadable and unwritable state, so that subsequent access to the critical data can be blocked.

Finally, the first critical code set is determined according to the recorded critical code.

Critical code determined by using the static analysis method is relatively complete, but is not highly accurate due to limitations of the method. A lot of related code obtained by means of the analysis is not actually related, and therefore, a relatively large trusted security base is obtained from final results. Consequently, the determined critical code is not totally accurate, and severe performance degradation may occur during running of the application. In contrast, critical code determined by using the foregoing dynamic analysis method is relatively accurate, and a definite relationship between the critical code obtained by means of the analysis and the critical data can be ensured. However, due to limitations of the method, 100% code coverage cannot be ensured, and some code related to the critical data cannot be obtained by means of the analysis. This leads to a false-positive error during running of the application.

Therefore, to ensure relatively high accuracy and completeness of the determined critical code, an embodiment of the present application further provides a mixed analysis mechanism, that is, a manner that combines a static analysis and a dynamic analysis.

Based on the critical code determined by using the foregoing dynamic analysis method, this embodiment of the present application may further include:

when a call to non-critical code in the application performed by using the first EPT causes an exception during running of the application, determining whether the non-critical code is in a second critical code set, where the second critical code set is code that is related to the critical data and that is determined by performing a static analysis on the source code in the application; and if t the non-critical code is in the second critical code set, updating the determined critical code, so that the non-critical code is updated to critical code; and reconfiguring the first EPT and the second EPT by using the determined critical data and the updated critical code.

In the foregoing mixed analysis mechanism, the accurate but incomplete first critical code set is first obtained by means of the dynamic analysis, and the complete but inaccurate second critical code set is obtained by means of the static analysis. During running of the application, the code in the first critical code set obtained by means of the dynamic analysis is used as the critical code. If a false-positive error occurs during running, that is, an exception occurs during running, that is, some non-critical code accesses the critical data, and the non-critical code belongs to the second critical code set obtained by means of the static analysis, the non-critical code is added to the first critical code set. Because a mode for accessing the critical data is relatively fixed in most cases, results obtained by means of the dynamic analysis are complete in most cases, and special cases like false-positive errors rarely occur and therefore have little impact on the overall results.

To further ensure security of the critical data, when step 23 is performed, this embodiment of the present application may include:

calling the critical code by using the second EPT, and performing formal verification on the critical code; and executing the critical code only after the formal verification on the critical code succeeds.

In this embodiment of the present application, because memory mapping relationships of critical data and critical code are not configured in a first EPT, and the memory mapping relationships of the critical data and the critical code are configured in a second EPT, the critical data can be accessed by using only the second EPT. Besides, because the critical data and the critical code are separately stored in independent memory areas, that is, the critical data and the critical code are stored separately from non-critical data and non-critical code, the critical data cannot be directly accessed by using the second EPT by means of a vulnerability in an application. Moreover, because switching from the first EPT to the second EPT can be implemented only according to preset trampoline code corresponding to the critical code, a malicious operational program cannot switch to the second EPT by launching a code embedding attack. In this way, the critical data in the application is protected to the greatest extent, and security of the critical data is improved.

The following describes in detail the data protection method provided in the embodiment of the present application.

First, a characteristic of EPTP switching in a virtualization technology is described.

In a virtual environment, memory virtualization is implemented by means of two levels of page table mapping. Each guest virtual address (Guest Virtual Address, GVA) in a guest virtual machine is first mapped to a guest physical address (Guest Physical Address, GPA), and then in a VMM, each GPA is mapped to a host physical address (Host Physical Address, HPA). That is, the VMM maintains a page table, which is referred to as an extended page table (Extended Page Table, EPT). Physical addresses in all guest virtual machines are mapped in the page table, and only mapped guest addresses in the page table are reflected in an actual physical memory. The page table is accessed by using a hardware register, and the register is referred to as an EPT pointer (EPTP). In theory, it is totally feasible to perform guest memory allocation by performing an operation on the EPT (that is, changing a mapping between a GPA and an HPA). However, in a normal mode, a memory mapping relationship in the EPT is modified by the VMM, and switching between different EPTPs in a virtual machine may cause a virtual machine exit, resulting in relatively high performance overheads.

In the embodiments of the present application, the characteristic of EPTP switching is used, and efficient switching between EPTs is performed in a virtual machine, thereby achieving an objective of memory separation. Specific characteristics of EPTP switching are as follows:

EPTP switching: The function is to change a value of an EPT pointer without causing a virtual machine to exit to a VMM. First, a series of EPTs and respective corresponding EPTPs may be created in the VMM, to form an EPTP array. Then, a head address of the EPTP array is added to a specific field EPTP_LIST_ADDR of a data structure VMCS. In a non-root mode of a guest virtual machine, a related instruction is called, and a register is set to a corresponding value, to implement an operation of EPTP switching, thereby efficiently switching from a current EPTP to a preconfigured EPTP stored in EPTP_LIST_ADDR without causing the virtual machine to exit.

The embodiments of the present application use the characteristic of EPTP switching. The critical data and the critical code are cleverly separated and combined by properly performing operations and configuration on the EPTs, and memory distribution diagrams are provided for an upper layer according to execution environments of different security levels. This solution has the following three features:

First, the solution can prevent a vulnerability in an application from leaking critical data; second, the solution can prevent a malicious operating system service from maliciously reading and leaking critical data; third, because a virtual machine does not need to exit, the solution can efficiently separate and protect critical data.

An entire process of the embodiments of the present application is divided into three stages:

Stage 1 (preprocessing stage): Critical data and critical code in an application are obtained by using a mixed analysis mechanism.

Stage 2 (VMM configuration stage): A new EPT is constructed for the critical data and the critical code, and the critical data and the critical code are separated from non-critical data and non-critical code.

Stage 3 (application running stage): Calling of EPTP switching is triggered at a suitable time point, and the critical data and the critical code are effectively separated by means of switching between EPTPs.

Figure 3:
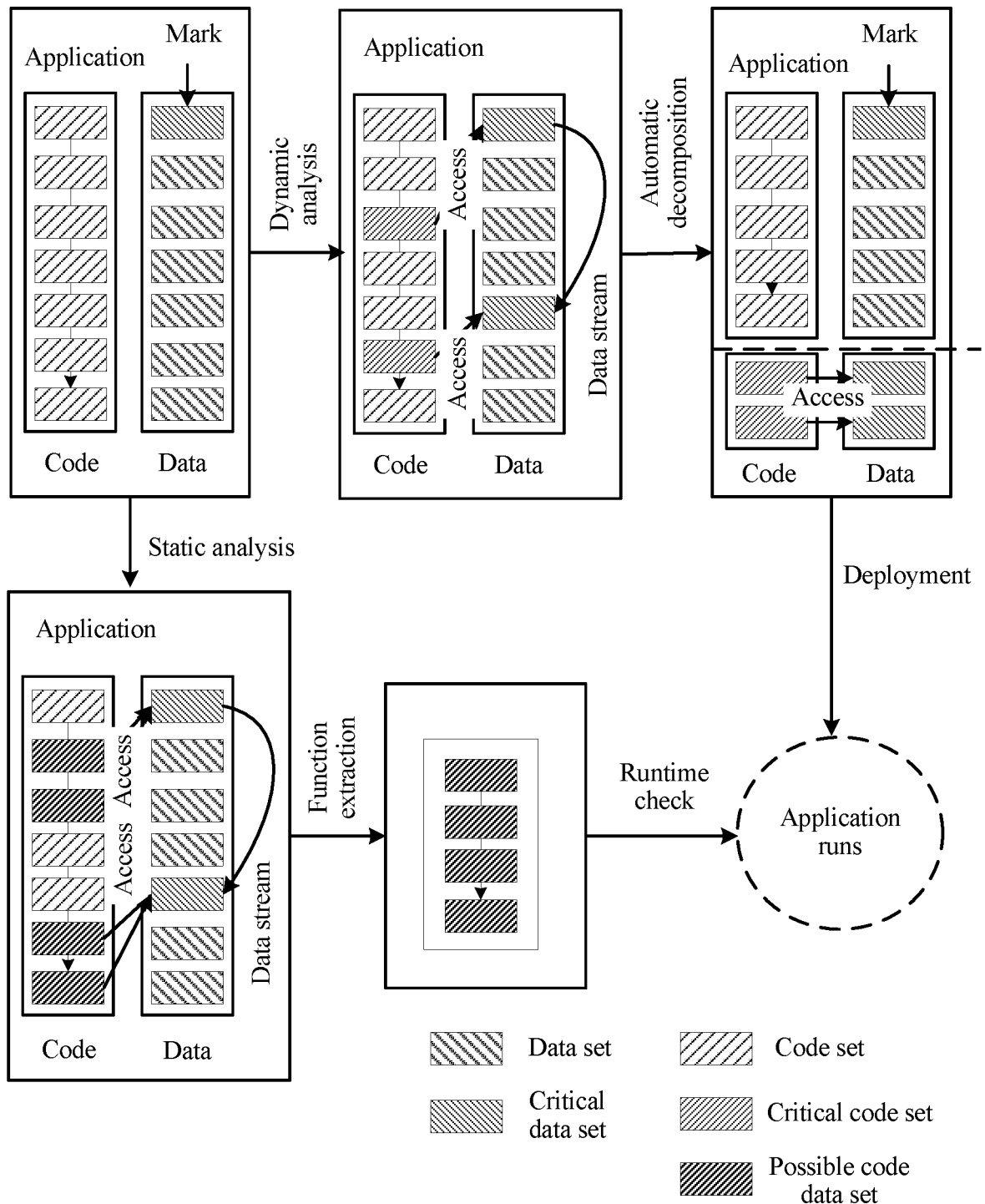
FIG. 3 is a schematic diagram of a mixed analysis mechanism and automatic reconstruction at a preprocessing stage.

Specific ideas of the embodiments of the present application are as follows:

FIG. 3 is a schematic diagram of a mixed analysis mechanism and automatic reconstruction at the preprocessing stage.

First, a static analysis and a dynamic analysis are performed on source code in an application, to determine critical data and critical code used to access the critical data.

Static Analysis Method:

An embodiment of the present application describes a static taint analysis (static taint analysis) method. It is assumed that a set of critical data is $\{s\}$, and a set of pointers pointing to the critical data is $\{s_{ref}\}$. An objective in this embodiment of the present application is to find a set of all instructions that may dereference the critical data pointers.

First, a series of taint transfer rules are defined:

1. For a pointer assignment y=x, if a right value x of the assignment statement belongs to $\{s_{ref}\}$, a left value y is also added to $\{s_{ref}\}$.

2. For a function call f(y$_1$, . . . , y$_i$, . . . , y$_n$), if an actual argument y$_i$ of the function belongs to {s$_{ref}$}, a formal argument arg$_i$ is also added to {s$_{ref}$}.

3. For a return value y=f(y$_1$, . . . , y$_i$, . . . , y$_n$) of the function call, if a return value ret$_f$ of the function belongs to {s$_{ref}$}, a variable y of a value assigned to the return value is also added to {s$_{ref}$}.

4. For a dereference instruction y=dereference(x) of the critical data, if x belongs to {s$_{ref}$}, a variable y obtained by means of dereference is added to {s}, a pointer y$_{ref}$ of the variable y is added to {s$_{ref}$}, and an instruction for the dereference is recorded.

Under the foregoing rule definitions, according to a polyvariant (Polyvariant) analysis theory, the function is iterated multiple times, and {s$_{ref}$} and {s} change continuously, until {s$_{ref}$} and {s} reach a stable point (that is, elements of the sets no longer change) and the static taint analysis ends.

By means of the analysis, a data stream of the critical data and a related instruction for accessing the critical data can be obtained, and therefore, related code is obtained. The code forms a possible first critical code set {f1}.

Figure 4:
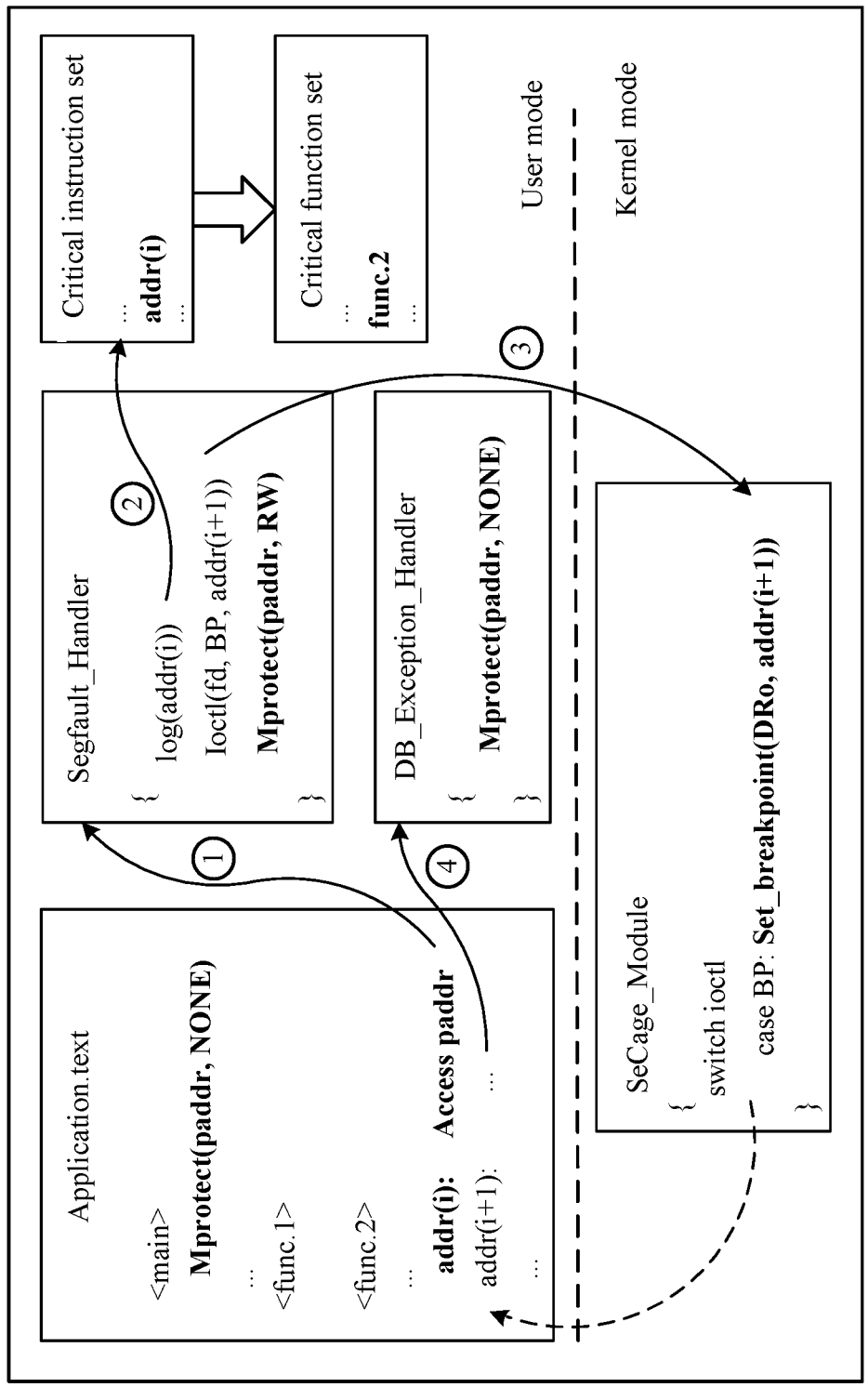
FIG. 4 is a schematic flowchart of a dynamic analysis.

Dynamic analysis method:

FIG. 4 is a schematic flowchart of a dynamic analysis. An embodiment of the present application is implemented by using memory protection (mprotect) and debug exception (debug exception) technologies. Specific steps are as follows:

1. First, a memory allocation function for the critical data is replaced with a security allocation function (secure_malloc). The function allocates a protected memory area to the critical data. It is assumed that an address of the memory area is paddr.

2. In addition, a segmentation fault handling function Segfault_Handler of a memory access segmentation fault (segmentation fault) is registered.

3. When any instruction addr(i) accesses the memory in which the critical data is located, a memory access segmentation fault is triggered, and the segmentation fault handling function Segfault_Handler is called.

4. The segmentation fault handling function records the instruction that triggers access to the critical data, converts the instruction into critical code, calls a kernel module SeCage_Module, sets a debug breakpoint (breakpoint) in a next instruction of the instruction, and sets the memory of the critical data to be readable and writable, so that the program can proceed instead of being stuck with the segmentation fault handling function.

5. When the next instruction addr(i+1) is executed, the debug breakpoint triggers a debug exception handling function (DB_Exception_Handler). The function sets the memory of the critical data to be unreadable and unwritable, so that subsequent access to the critical data can be blocked.

The foregoing process is executed until the application stops running. In this way, a second critical function set {f2} for accessing the critical data can be obtained.

In the embodiments of the present application, at the preprocessing stage, the result {f2} obtained by means of the dynamic analysis is first used as a critical code set during running of the application, and the result {f1} obtained by means of the static analysis is used as reference data. A corresponding function is added to the critical code set only when an exception occurs during running, that is, when a function that belongs to {f1} but does not belong to {f2} accesses the critical data. In this way, a size of the critical code set can be limited, performance degradation can be reduced, and completeness of an analysis result can be ensured.

After the critical data and the critical code used to access the critical data are determined, the determined critical code is stored in a same memory area by using a section attribute (section attribute) provided by a GCC (GNU Compiler Collection, GNU compiler collection), and the malloc function of the critical data is replaced, so that a same memory area is allocated to the critical data. Besides, a call to the critical code also needs to be replaced.

Figure 5:
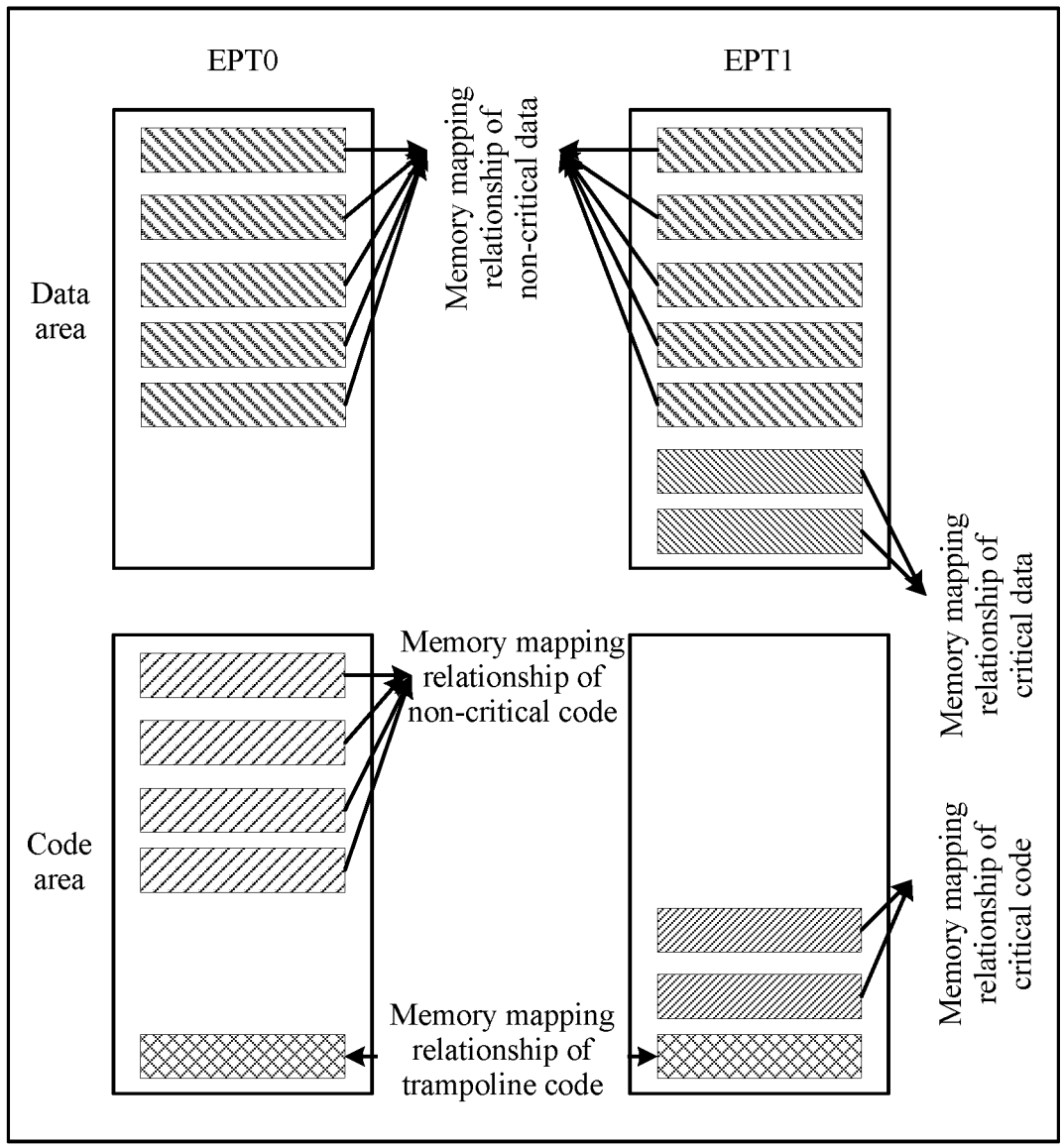
FIG. 5 is a diagram of EPT construction based on critical data and critical code at a VMM configuration stage.

FIG. 5 is a diagram of EPT construction based on critical data and critical code at the VMM configuration stage. A new EPT (referred to as EPT1 below) is constructed in a VMM based on the foregoing obtained critical data and critical code, and a mapping relationship between a related GPA and HPA in an original EPT (referred to as EPT0 below) is modified.

First, the memory of the application is divided into two parts: a data area and a code area, and the two areas are treated differently:

For the data area, a memory mapping relationship of the critical data is removed from EPT0, and memory mapping relationships of all pieces of data are kept in EPT1.

For the code area, a memory mapping relationship of the critical code is removed from EPT0, and a memory mapping relationship of non-critical code is kept; the memory mapping relationship of non-critical code is removed from EPT1, and the memory mapping relationship of the critical code is kept.

Besides, a memory area used to store a special piece of code (referred to as trampoline code) further needs to be constructed. The code is used to switch between two states. Both EPT0 and EPT1 maintain the memory mapping relationship.

Figure 6:
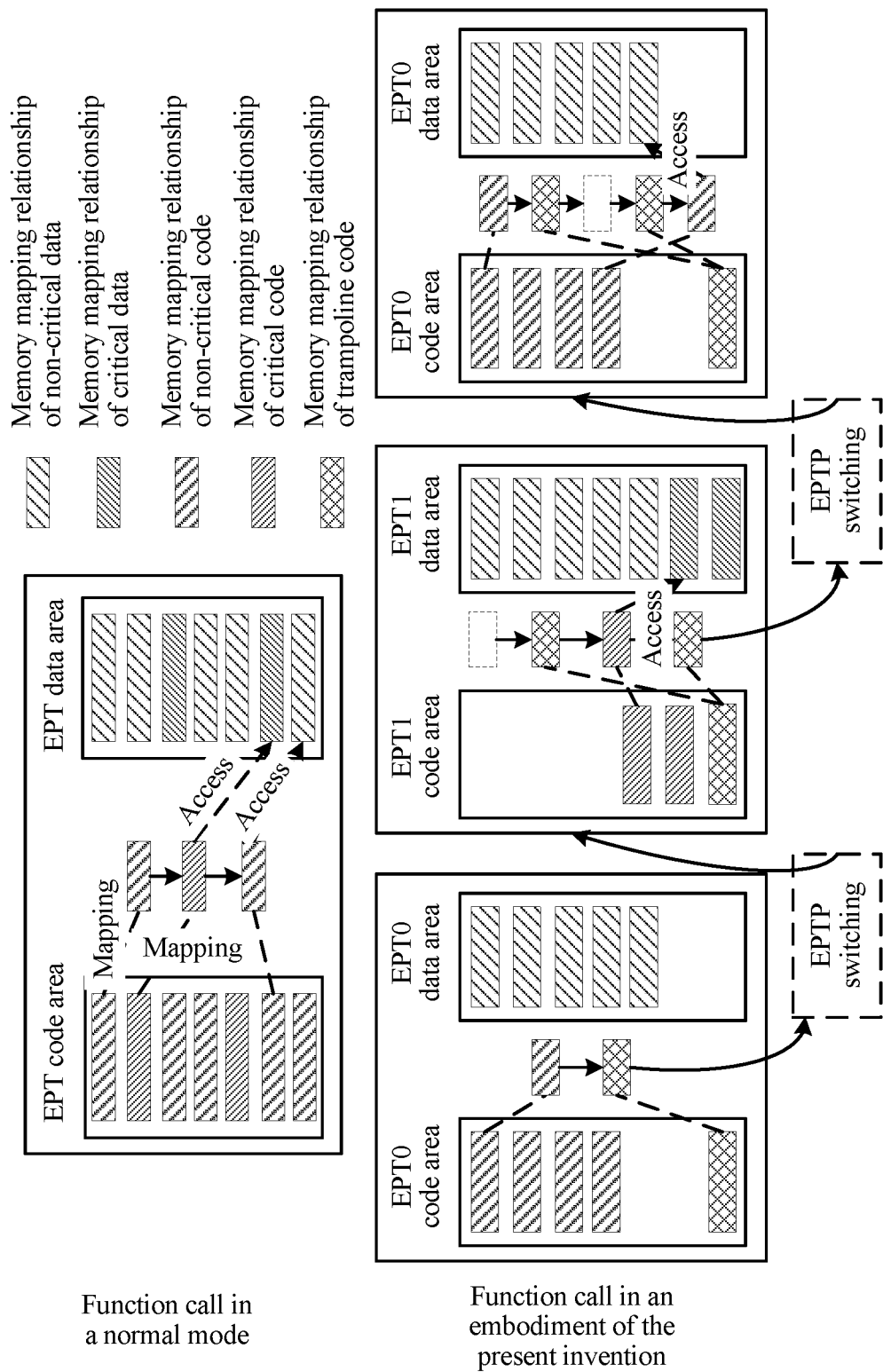
FIG. 6 is a flowchart of an application executing critical code at an application running stage.

FIG. 6 is a flowchart of an application executing critical code at the application running stage.

At an application running stage of a guest virtual machine, EPT0 is executed by default. When a call to the critical code needs to be executed, because the critical code is already replaced at the foregoing preprocessing stage, a flow of execution is redirected to the trampoline code.

In the trampoline code, EPTP switching is called, to transfer a related argument to the EPTP, thereby replacing EPT0 with EPT1 without causing the virtual machine to exit;

the critical code is called and executed by using EPT1, to access the critical data; and after the critical code is executed, the flow of execution returns to the trampoline code, and EPTP switching is called again, to replace EPT1 with EPT0.

It should be noted that, in the embodiments of the present application, it needs to be ensured that the critical code mapped into EPT1 is secure and has no vulnerability. Because the critical code is small in amount, which indicates a small trusted computing base, formal verification may be performed on the critical code. In addition, at an initialization stage, it further needs to be ensured that an entire environment is secure and obtained data can be trusted, and this is also attainable. Because this is a one-time operation, verification may be performed on the obtained data. Moreover, write protection also needs to be performed on the trampoline code, to prevent a malicious operating system from modifying the trampoline code and launching a code embedding attack.

In addition, the foregoing critical code and trampoline code may both use a form of a function.

By means of the foregoing design, the initial objective, that is, protecting critical data of an application and preventing the critical data from being modified and leaked by means of an application vulnerability and by a malicious operating system, can be achieved. Because critical data and critical code are stored separately from non-critical data and non-critical code in the application, the critical code cannot be accessed by using EPT1 by means of the vulnerability in the application. Besides, because actual physical mappings of the critical data and the critical code are maintained by a VMM, the malicious operating system cannot read the critical data by using EPT1 without executing the piece of code. Moreover, because in EPT1, only trampoline code can call EPTP switching (because a mapping of non-critical code is removed from EPT1, a call to EPTP switching at other code points causes a memory access failure), the malicious operating system cannot attach a code embedding attack to replace EPT1 to access the critical data.

For ease of understanding the embodiments of the present application, the following describes a specific implementation process of the embodiments of the present application by using protection of critical data, that is, a private key, in OpenSSL as an example.

In OpenSSL, a private key is stored in several bignum (BIGNUM) structures of a data structure struct rsa_st. Among these bignums, p, q, and d are three most important ones. Leakage of these bignums enables an attacker to reconstruct the private key. Besides, these bignums are transferred to other memory areas during encryption and decryption, and several functions in an encryption library of OpenSSL access these pieces of data. If a vulnerability of memory leakage is exploited to read these bignums in a heartbleed attack, leakage of the private key may be caused. Besides, a malicious operating system can also leak the key by reading a related memory area.

Security of the private key in OpenSSL is protected by using a method provided by an embodiment of the present application. A specific process is as follows:

Step 1: Perform a static analysis on source code in OpenSSL, and determine, according to the pre-marked critical data bignums p, q, and d, other memory areas from which the bignums are transferred out, to obtain a critical data set D and a function set C used to access the critical data set D.

Step 2: Modify a definition of the function set C in the source code by using a GCC compiler option, allocate a same independent memory area to all functions in the function set, and replace calls to these functions with a call to a trampoline function.

Step 3: Replace corresponding OPENSSL_malloc in the critical data set D with defined secure_malloc, and allocate an independent memory area to the critical data during running.

Step 4: Configure a VMM. First, enable support of EPTP switching by a processor; then, construct a new EPT (EPT1) according to the data area and the code area that are obtained in step 2 and step 3, modify memory mapping relationships of the corresponding data area and code area in an original EPT (EPT0), store EPT0 and EPT1 in an EPT array, and write a head address of the array into an EPTP_LIST_ADDR field in VMCS.

Step 5: An application in a guest virtual machine runs in EPT0 by default. Because there are no memory mapping relationships of the critical data and related functions in EPT0, the application cannot access the critical data in such a state.

Step 6: When needing to call related functions, the application calls a predefined trampoline function. The trampoline function executes EPTP switching to replace a current EPT with EPT1. Then, the related functions in EPT1 are called, and the bignums in the private key are accessed in these functions, until the application returns from the related functions to the trampoline function, which executes EPTP switching to replace EPT1 with EPT0, and the application continues to run in a default environment.

If other library functions or system calls are called in the related functions in EPT1, the application calls the trampoline function to replace the EPT with EPT0, and executes the library functions and the system calls in the default environment, until the application returns from the library functions and the system calls and continues to execute the related functions in EPT1.

Based on the same inventive idea, an embodiment of the present application further provides a data protection apparatus and device. Because a problem resolving principle of the foregoing apparatus and device is similar to that of the data protection method, for implementation of the foregoing apparatus and device, refer to the implementation of the method, and details are not repeated herein.

Figure 7:
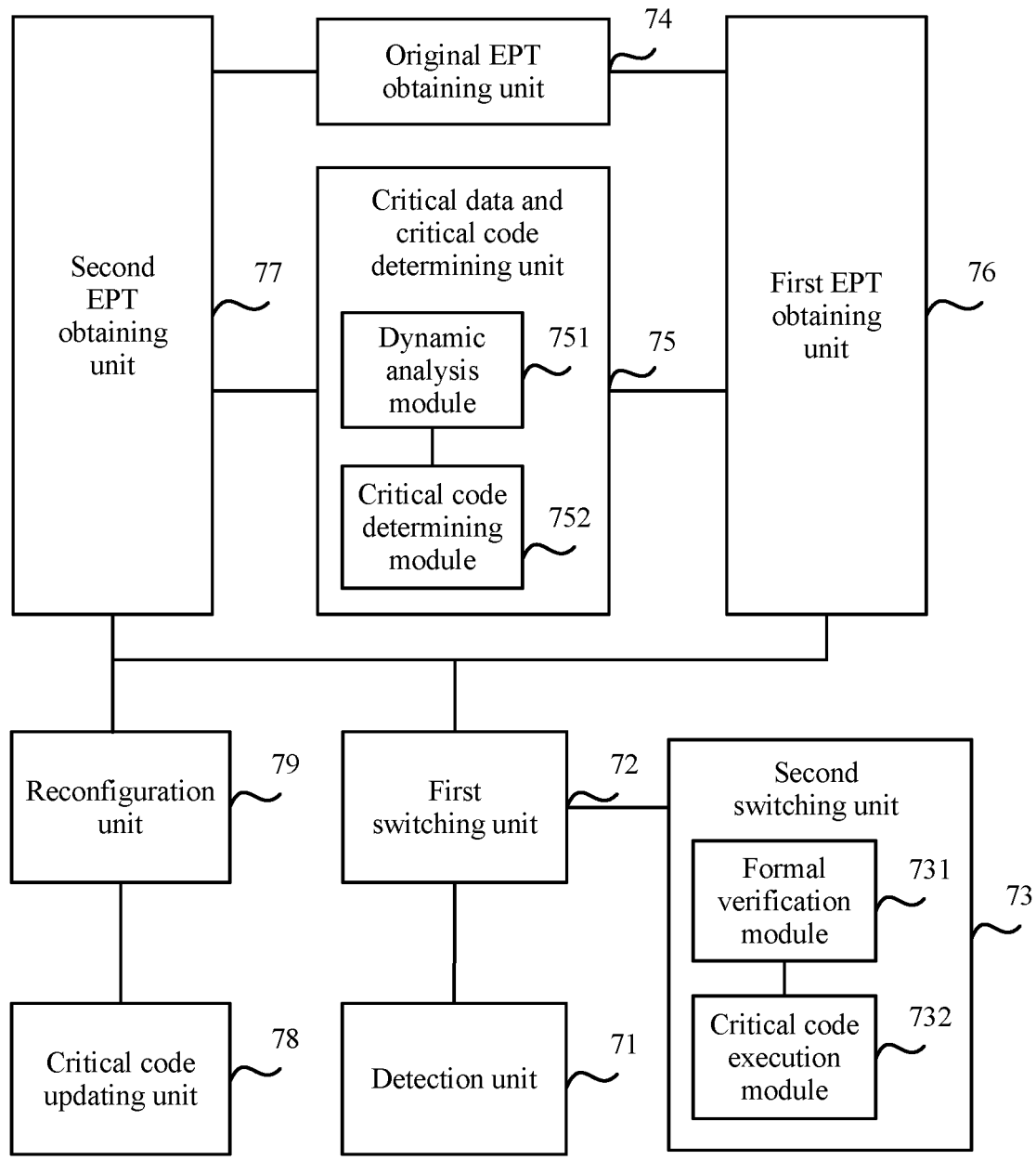
FIG. 7 is a schematic structural diagram of a data protection apparatus according to an embodiment of the present application.

FIG. 7 is a schematic structural diagram of a data protection apparatus according to an embodiment of the present application, including:

a detection unit 71, configured to detect whether critical code that is in an application and that is used to access critical data is called;

a first switching unit 72, configured to: when the detection unit 71 detects that an operating system calls the critical code by using a preconfigured first extended page table EPT, switch from the first EPT to a preconfigured second EPT according to preset trampoline code corresponding to the critical code, where memory mapping relationships of the critical data and the critical code are not configured in the first EPT, the memory mapping relationships of the critical data and the critical code are configured in the second EPT, and the critical data and the critical code are separately stored in independent memory areas; and a second switching unit 73, configured to: after the critical code is called and executed by using the second EPT to which the first switching unit 72 switches, switch from the second EPT back to the first EPT according to the trampoline code.

Optionally, the apparatus further includes: an original EPT obtaining unit 74, a critical data and critical code determining unit 75, and a first EPT obtaining unit 76.

The original EPT obtaining unit 74 is configured to obtain an original EPT, where memory mapping relationships of all pieces of data and memory mapping relationships of all pieces of code in the application are configured in the original EPT.

The critical data and critical code determining unit 75 is configured to determine the critical data and the critical code used to access the critical data.

The first EPT obtaining unit 76 is configured to delete, according to a memory area in which the critical data determined by the critical data and critical code determining unit 75 is located and a memory area in which the critical code determined by the critical data and critical code determining unit 75 is located, the memory mapping relationships of the critical data and the critical code in the original EPT obtained by the original EPT obtaining unit 74, and add a memory mapping relationship of the trampoline code to the original EPT, to obtain the first EPT.

Optionally, the apparatus further includes:

a second EPT obtaining unit 77, configured to: after the critical data and critical code determining unit 75 determines the critical data and the critical code used to access the critical data, adjust the memory area in which the critical data is located and the memory area in which the critical code is located, so that the critical data and the critical code are separately stored in independent memory areas; and correspondingly adjust, according to adjusted memory areas in which the critical data and the critical code are located, the memory mapping relationships of the critical data and the critical code in the original EPT obtained by the original EPT obtaining unit 74, delete a memory mapping relationship of non-critical code in the original EPT, and add the memory mapping relationship of the trampoline code to the original EPT, to obtain the second EPT.

Optionally, the critical data and critical code determining unit 75 includes:

a dynamic analysis module 751, configured to perform a dynamic analysis on source code in the application, to determine a first critical code set related to the critical data; and a critical code determining module 752, configured to determine code in the first critical code set, which is determined by the dynamic analysis module 751, as the critical code used to access the critical data.

Optionally, the dynamic analysis module 751 is configured to:

adjust the memory area in which the critical data is located, so that the critical data is stored in an independent memory area, where the independent memory area in which the critical data is located is set to be in an unreadable and unwritable state; when any instruction accesses the memory area in which the critical data is located, record critical code corresponding to the instruction; set the independent memory area in which the critical data is located to be in a readable and writable state; and set a debug breakpoint in a next instruction of the instruction, so that when the next instruction of the instruction is executed, the debug breakpoint triggers an operation of setting the independent memory area in which the critical data is located to be in the unreadable and unwritable state; and determine the first critical code set according to the recorded critical code.

Optionally, the apparatus further includes: a critical code update unit 78 and a reconfiguration unit 79.

The critical code update unit 78 is configured to: when a call to non-critical code in the application performed by using the first EPT causes an exception during running of the application, determine whether the non-critical code is in a second critical code set, where the second critical code set is code that is related to the critical data and that is determined by performing a static analysis on the source code in the application; and if yes, update the determined critical code, so that the non-critical code is updated to critical code.

The reconfiguration unit 79 is configured to reconfigure the first EPT and the second EPT by using the critical data and the critical code updated by the critical code update unit 78.

Optionally, the first switching unit 72 is configured to:

call extended page table pointer switching EPTP switching according to the trampoline code, to switch from the first EPT to the second EPT.

Optionally, the second switching unit 73 is configured to:

call EPTP switching according to the trampoline function, to switch from the second EPT back to the first EPT.

Optionally, the second switching unit 73 includes:

a formal verification module 731, configured to: call the critical code by using the second EPT, and perform formal verification on the critical code; and a critical code execution module 732, configured to execute the critical code after the formal verification performed by the formal verification module 731 on the critical code succeeds.

For convenience of description, the foregoing parts are divided into modules (or units) according to functions, and are described separately. Certainly, during implementation of the present application, the functions of the modules (or units) may be implemented in one or more pieces of software or hardware.

During specific implementation, the foregoing data protection apparatus may be disposed in a guest virtual machine.

Figure 8:
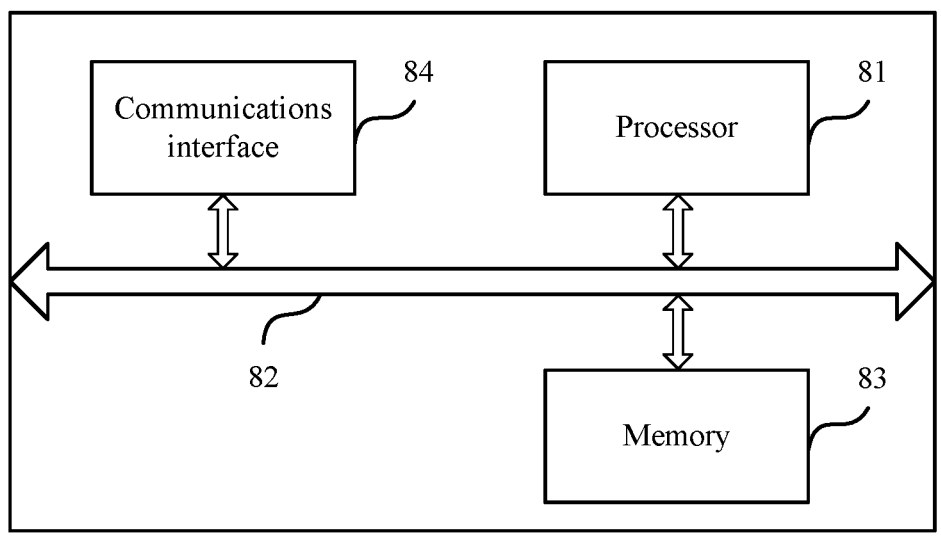
FIG. 8 is a schematic structural diagram of hardware of a data protection apparatus according to an embodiment of the present application.

Correspondingly, an embodiment of the present application further provides a data protection apparatus. FIG. 8 is a schematic structural diagram of hardware of the apparatus. The apparatus has a function of executing the foregoing embodiment of the present application. The apparatus may use a structure of a general-purpose computer system. The computer system may be a processor-based computer. The apparatus includes at least one processor 81, a communications bus 82, a memory 83, and at least one communications interface 84.

The processor 81 may be a general-purpose central processing unit (CPU), a microprocessor, an application-specific integrated circuit (application-specific integrated circuit, ASIC), or one or more integrated circuits configured to control execution of a program in the solution of the present application.

The communications bus 82 may include a channel, used to transfer information between the foregoing components. The communications interface 84, which uses any apparatus like a transceiver, is configured to communicate with another device or communications network, such as the Ethernet, a radio access network (RAN), or a Wireless Local Area Network (WLAN).

The computer system includes one or more memories 83. The memory may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compressed optical disc, a laser disc, a compact disc, a digital versatile disc, a blue-ray disc, and the like), a disk storage medium or another magnetic storage device, or another medium that can be used to carry or store expected program code in a form of an instruction or a data structure and that can be accessed by a computer, but the present application is not limited thereto. These memories are connected to the processor 81 by using the communications bus 82.

The memory 83 is configured to store application code for executing the solution of the present application. The application code for executing the solution of the present application is stored in the memory, and execution of the application code is controlled by the processor 81. The processor 81 is configured to execute an application stored in the memory 83.

When executed by the processor 81, the foregoing application implements the following functions:

detecting whether critical code that is in an application and that is used to access critical data is called;

during running of the application, when detecting that an operating system calls the critical code by using a preconfigured first extended page table EPT, switching from the first EPT to a preconfigured second EPT according to preset trampoline code corresponding to the critical code, where memory mapping relationships of the critical data and the critical code are not configured in the first EPT, the memory mapping relationships of the critical data and the critical code are configured in the second EPT, and the critical data and the critical code are separately stored in independent memory areas; and after calling and executing the critical code by using the second EPT, switching from the second EPT back to the first EPT according to the trampoline code.

In a possible implementation, before the detecting whether critical code that is in an application and that is used to access critical data is called, the functions further include:

obtaining an original EPT, where memory mapping relationships of all pieces of data and memory mapping relationships of all pieces of code in the application are configured in the original EPT;

determining the critical data and the critical code used to access the critical data; and deleting the memory mapping relationships of the critical data and the critical code in the original EPT according to a memory area in which the critical data is located and a memory area in which the critical code is located, and adding a memory mapping relationship of the trampoline code to the original EPT, to obtain the first EPT.

In another possible implementation, after the determining the critical data and the critical code used to access the critical data, the functions further include:

adjusting the memory area in which the critical data is located and the memory area in which the critical code is located, so that the critical data and the critical code are separately stored in independent memory areas; and correspondingly adjusting the memory mapping relationships of the critical data and the critical code in the original EPT according to adjusted memory areas in which the critical data and the critical code are located, deleting a memory mapping relationship of non-critical code in the original EPT, and adding the memory mapping relationship of the trampoline code to the original EPT, to obtain the second EPT.

In another possible implementation, the determining the critical code used to access the critical data includes:

performing a dynamic analysis on source code in the application, to determine a first critical code set related to the critical data; and determining code in the first critical code set as the critical code used to access the critical data.

In another possible implementation, the performing a dynamic analysis on source code in the application, to determine a first critical code set related to the critical data includes:

adjusting the memory area in which the critical data is located, so that the critical data is stored in an independent memory area, where the independent memory area in which the critical data is located is set to be in an unreadable and unwritable state;

during running of the application, when any instruction is executed to access the memory area in which the critical data is located, recording critical code corresponding to the instruction; setting the independent memory area in which the critical data is located to be in a readable and writable state; and setting a debug breakpoint in a next instruction of the instruction, so that when the next instruction of the instruction is executed, the debug breakpoint triggers an operation of setting the independent memory area in which the critical data is located to be in the unreadable and unwritable state; and determining the first critical code set according to the recorded critical code.

In another possible implementation, the functions further include:

when a call to non-critical code in the application performed by using the first EPT causes an exception during running of the application, determining whether the non-critical code is in a second critical code set, where the second critical code set is code that is related to the critical data and that is determined by performing a static analysis on the source code in the application; and if yes, updating the determined critical code, so that the non-critical code is updated to critical code; and reconfiguring the first EPT and the second EPT by using the determined critical data and the updated critical code.

In another possible implementation, the switching from the first EPT to a preconfigured second EPT according to preset trampoline code corresponding to the critical code includes:

calling extended page table pointer switching EPTP switching according to the trampoline code, to switch from the first EPT to the second EPT.

In another possible implementation, the switching from the second EPT back to the first EPT according to the trampoline code includes:

calling EPTP switching according to the trampoline function, to switch from the second EPT back to the first EPT.

In another possible implementation, the calling and executing the critical code by using the second EPT includes:

calling the critical code by using the second EPT, and performing formal verification on the critical code; and executing the critical code after the formal verification on the critical code succeeds.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer, or another programmable device, provide steps for implementing a specific function in one or more processes in the flowcharts and/or in one or more blocks in the block diagrams.

Although some embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the present application without departing from the scope of the present application. The present application is intended to cover these modifications and variations provided that they fall within the scope of protection defined by the following claims and their equivalent technologies.

What is claimed is:

1. A data protection method, comprising:
obtaining an original EPT, wherein data memory mapping relationships in an application and code memory mapping relationships in the application are configured in the original EPT;
deleting data memory mapping relationships of critical data and code memory mapping relationships of critical code used to access the critical data in the original EPT according to a critical data memory area in which the critical data is located and a critical code memory area in which the critical code is located, and
adding a memory mapping relationship of preset trampoline code to the original EPT to obtain a preconfigured first extended page table (EPT);
detecting whether the critical code of the application has been called, with the critical code being used to access the critical data;
switching from the first EPT to a preconfigured second EPT according to the trampoline code corresponding to the critical code when an operating system calls the critical code using the first EPT, wherein:
the memory mapping relationships of the critical data and the critical code are not configured in the first EPT;
the memory mapping relationships of the critical data and the critical code are configured in the second EPT; and
the critical data and the critical code are separately stored in independent memory areas; and
switching from the second EPT back to the first EPT according to the trampoline code after calling and executing the critical code using the second EPT.

2. The method according to claim 1, wherein after the determining the critical data and the critical code used to access the critical data, the method further comprises:
adjusting the memory area in which the critical data is located and the memory area in which the critical code is located, so that the critical data and the critical code are separately stored in independent memory areas;
correspondingly adjusting the memory mapping relationships of the critical data and the critical code in the original EPT according to adjusted memory areas in which the critical data and the critical code are located;
deleting a memory mapping relationship of non-critical code in the original EPT; and
adding the memory mapping relationship of the trampoline code to the original EPT to obtain the second EPT.

3. The method according to claim 1, wherein the determining the critical code used to access the critical data comprises:
performing a dynamic analysis on source code in the application to determine a first critical code set related to the critical data; and
determining code in the first critical code set as the critical code used to access the critical data.

4. The method according to claim 3, wherein the performing the dynamic analysis on the source code comprises:
adjusting the memory area in which the critical data is located so the critical data is stored in an independent memory area;
when any instruction is received to access the memory area in which the critical data is located, recording critical code corresponding to the instruction; and
determining the first critical code set according to the recorded critical code.

5. The method according to claim 1, wherein the method further comprises:
when a call to non-critical code in the application performed by using the first EPT causes an exception during running of the application, determining whether the non-critical code is in a second critical code set, wherein the second critical code set comprises code that is related to the critical data and that is determined by performing a static analysis on the source code in the application; and
if the non-critical code is in the second critical code set, updating the determined critical code so the non-critical code is updated to critical code; and
reconfiguring the first EPT and the second EPT using the determined critical data and the updated critical code.

6. The method according to claim 1, wherein the switching from the first EPT to the second EPT according to the preset trampoline code corresponding to the critical code comprises:
calling extended page table pointer (EPTP) switching according to the trampoline code, to switch from the first EPT to the second EPT.

7. The method according to claim 1, wherein the switching from the second EPT back to the first EPT according to the trampoline code comprises:
calling extended page table pointer (EPTP) switching according to the trampoline code, to switch from the second EPT back to the first EPT.

8. The method according to claim 1, wherein the calling and executing the critical code using the second EPT comprises:
calling the critical code using the second EPT and performing formal verification on the critical code; and executing the critical code after the formal verification on the critical code succeeds.

9. A data protection apparatus, comprising:
a memory configured to store instructions; and
a processor coupled to the processor and configured to execute the instructions, which cause the processor to be configured to:
obtain an original EPT, wherein data memory mapping relationships of all pieces of data in an application and memory mapping relationships of all pieces of code in the application are configured in a preconfigured first extended page table (EPT);
determine critical data and critical code used to access the critical data;
delete the memory mapping relationships of the critical data and the critical code in the original EPT according to a critical data memory area in which the critical data is located and a critical code memory area in which the critical code is located;
add a memory mapping relationship of preset trampoline code to the original EPT to obtain the first EPT;
detect whether the critical code in the application has been called, with the critical code being used to access the critical data;
switch from the first EPT to a preconfigured second EPT according to the trampoline code corresponding to the critical code when an operating system calls the critical code using the first EPT, wherein:
the memory mapping relationships of the critical data and the critical code are not configured in the first EPT;
the memory mapping relationships of the critical data and the critical code are configured in the second EPT; and
the critical data and the critical code are separately stored in independent memory areas;
switch from the second EPT back to the first EPT according to the trampoline code after the critical code is called and executed using the second EPT.

10. The apparatus according to claim 9, the processor further executing the instructions to:
adjust the critical data memory area in which the critical data is located and the critical code memory area in which the critical code is located, so that the critical data and the critical code are separately stored in independent memory areas;
correspondingly adjust, according to adjusted memory areas where the critical data and the critical code are located, the memory mapping relationships of the critical data and the critical code in the original EPT;
delete a memory mapping relationship of non-critical code in the original EPT; and
add the memory mapping relationship of the trampoline code to the original EPT, to obtain the second EPT.

11. The apparatus according to claim 9, the processor further executing the instructions to:
perform a dynamic analysis on source code in the application to determine a first critical code set related to the critical data; and
determine code in the first critical code set, with the first critical code set being determined as being the critical code used to access the critical data.

12. The apparatus according to claim 11, the processor further executing the instructions to:
adjust the memory area in which the critical data is located so the critical data is stored in an independent memory area;
when any instruction accesses the memory area in which the critical data is located, record critical code corresponding to the instruction; and
determine the first critical code set according to the recorded critical code.

13. The apparatus according to claim 9, the processor further executing the instructions to:
when a call to non-critical code in the application performed using the first EPT causes an exception during running of the application, determine whether the non-critical code is in a second critical code set, wherein the second critical code set is code that is related to the critical data and that is determined by performing a static analysis on the source code in the application;
if the non-critical code is in a second critical code set, update the determined critical code so the non-critical code is updated to critical code; and
reconfigure the first EPT and the second EPT using the critical data and the updated critical code.

14. The apparatus according to claim 9, the processor further executing the instructions to:
call extended page table pointer (EPTP) switching according to the trampoline code, to switch from the first EPT to the second EPT.

15. The apparatus according to claim 9, the processor further executing the instructions to:
call extended page table pointer (EPTP) switching according to the trampoline code, to switch from the second EPT back to the first EPT.

16. The apparatus according to claim 9, the processor further executing the instructions to:
call the critical code using the second EPT; and
perform formal verification on the critical code; and
execute the critical code after the formal verification on the critical code succeeds.

* * * * *